(12) United States Patent
Lovett et al.

(10) Patent No.: US 10,436,117 B2
(45) Date of Patent: Oct. 8, 2019

(54) CARBURETED FUEL INJECTION SYSTEM FOR A GAS TURBINE ENGINE

(71) Applicant: United Technologies Corporation, Hartford, CT (US)

(72) Inventors: Jeffery A. Lovett, Tolland, CT (US); Darin A. Knaus, Lyme, NH (US); Scott D. Phillips, Enfield, NH (US); Daniel J. Micka, Enfield, NH (US); Patrick Magari, Plainfield, NH (US)

(73) Assignee: United Technologies Corporation, Farmington, CT (US)

( * ) Notice: Subject to any disclaimer, the term of this patent is extended or adjusted under 35 U.S.C. 154(b) by 954 days.

(21) Appl. No.: 14/083,040

(22) Filed: Nov. 18, 2013

(65) Prior Publication Data

US 2015/0285148 A1 Oct. 8, 2015

Related U.S. Application Data

(60) Provisional application No. 61/754,365, filed on Jan. 18, 2013.

(51) Int. Cl.
| | |
|---|---|
| *F02C 7/22* | (2006.01) |
| *F23R 3/20* | (2006.01) |
| *F23R 3/30* | (2006.01) |
| *F23R 3/28* | (2006.01) |
| *F02K 3/10* | (2006.01) |

(52) U.S. Cl.
CPC .................. *F02C 7/22* (2013.01); *F02K 3/10* (2013.01); *F23R 3/20* (2013.01); *F23R 3/286* (2013.01); *F23R 3/30* (2013.01); *Y10T 29/494* (2015.01)

(58) Field of Classification Search
CPC ...... F02C 7/22; F02K 3/10; F23R 3/20; F23R 3/30

See application file for complete search history.

(56) References Cited

U.S. PATENT DOCUMENTS

| | | | |
|---|---|---|---|
| 5,042,963 A | 8/1991 | Sorenson et al. | |
| 5,203,796 A * | 4/1993 | Washam | F23R 3/20 60/737 |
| 5,685,140 A * | 11/1997 | Clements | F23R 3/20 60/204 |
| 6,318,958 B1 | 11/2001 | Giesler et al. | |
| 6,623,238 B2 | 9/2003 | Langston et al. | |
| 6,681,579 B2 | 1/2004 | Lane et al. | |
| 6,684,898 B2 | 2/2004 | Wiggins et al. | |
| 6,991,425 B2 | 1/2006 | Kruegel et al. | |
| 7,014,419 B2 | 3/2006 | Farnsworth et al. | |
| 7,033,133 B2 | 4/2006 | Bristol et al. | |

(Continued)

*Primary Examiner* — Scott J Walthour
(74) *Attorney, Agent, or Firm* — O'Shea Getz P.C.

(57) ABSTRACT

A fuel injection system for a gas turbine engine includes a vane in an airflow path within the gas turbine engine, the vane includes an air channel with an outlet in communication with the airflow path; and a fuel nozzle within the vane operable to inject fuel into the air channel to at least partially premix and prevaporize the fuel with a secondary airflow from within the vane in the air channel prior to entry into the airflow path through the outlet. A method of injecting fuel within a gas turbine engine includes at least partially premixing and prevaporizing fuel with a secondary airflow from within a vane in an air channel within the vane, the vane within an airflow path of the gas turbine engine.

14 Claims, 6 Drawing Sheets

(56) References Cited

U.S. PATENT DOCUMENTS

| | | |
|---|---|---|
| 7,033,134 B2 | 4/2006 | Bristol et al. |
| 7,066,710 B2 | 6/2006 | Wiggins et al. |
| 7,086,514 B2 | 8/2006 | Langston |
| 7,147,430 B2 | 12/2006 | Wiggins et al. |
| 7,186,081 B2 | 3/2007 | Giesler et al. |
| 7,445,102 B2 | 11/2008 | Lane et al. |
| 2007/0151250 A1* | 7/2007 | Haynes ............... F23R 3/54 60/772 |
| 2009/0199561 A1* | 8/2009 | Hessler ............... F23D 11/24 60/734 |
| 2010/0126177 A1* | 5/2010 | Hautman ............ F23R 3/20 60/752 |

* cited by examiner

CARBURETED FUEL INJECTION SYSTEM FOR A GAS TURBINE ENGINE

The present disclosure claims priority to U.S. Provisional Patent Disclosure Ser. No. 61/754,365, filed Jan. 18, 2013.

STATEMENT REGARDING FEDERALLY SPONSORED RESEARCH OR DEVELOPMENT

This disclosure was made with Government support under FA8650-11-M-2157 awarded by The United States Air Force. The Government has certain rights in this invention.

BACKGROUND

The present disclosure relates to gas turbine engines, and more particularly to a fuel injection system therefor.

Gas turbine engines, such as those which power modern aircraft, include a compressor section to pressurize a supply of air, a combustor section to burn a hydrocarbon fuel in the presence of the pressurized air, and a turbine section to extract energy from the resultant combustion gases and generate thrust. On military engines, downstream of the turbine section, an augmentor section, or "afterburner", is operable to selectively increase the thrust. The increase in thrust is produced when fuel is injected into the core exhaust gases downstream of the turbine section and burned with the oxygen contained therein with the aid of flameholders to generate a second combustion.

Typically, the injected fuel is controlled to penetrate relatively deep into the core exhaust gases to provide good mixing and increase augmentor efficiency as well as the magnitude of the supplemental engine thrust. Such deep fuel penetration, however, is dependent on the fuel flow rate which may negatively impact flame stability and increase augmentor instabilities commonly called "screech" as the fuel penetrates away for the flameholder device.

SUMMARY

A fuel injection system for a gas turbine engine according to one disclosed non-limiting embodiment of the present disclosure includes a vane in an airflow path within the gas turbine engine, the vane includes an air channel with an outlet in communication with the airflow path; and a fuel nozzle within the vane operable to inject fuel into the air channel to at least partial premix and prevaporize the fuel with a secondary airflow from within the vane in the air channel prior to entry into the airflow path through the outlet.

A further embodiment of the present disclosure includes, wherein the fuel nozzle is directed downstream with respect to airflow through the air channel.

A further embodiment of any of the foregoing embodiments of the present disclosure includes, wherein the fuel nozzle is directed upstream with respect to airflow through the air channel.

A further embodiment of any of the foregoing embodiments of the present disclosure includes, wherein the airflow path is a core airflow path within the gas turbine engine.

A further embodiment of any of the foregoing embodiments of the present disclosure includes, wherein the airflow path is a primary combustion gas exhaust airflow.

A further embodiment of any of the foregoing embodiments of the present disclosure includes, wherein the airflow path is within a combustor section of the gas turbine engine.

A further embodiment of any of the foregoing embodiments of the present disclosure includes a second fuel injector within the vane, the second fuel injector is positioned downstream with respect to the outlet from the air channel.

A further embodiment of any of the foregoing embodiments of the present disclosure includes, wherein the second fuel injector directly injects fuel into the primary combustion gas exhaust airflow.

A further embodiment of any of the foregoing embodiments of the present disclosure includes, wherein an interior of the vane receives the secondary airflow such that the interior is at a higher pressure than an airflow within the airflow path.

A gas turbine engine according to another disclosed non-limiting embodiment of the present disclosure includes a vane in an airflow path within the gas turbine engine, the vane includes an air channel with an outlet in communication with the airflow path; a first fuel nozzle within the vane operable to inject fuel into the air channel to at least partially premix and prevaporize the fuel with a secondary airflow from within the vane in the air channel prior to entry into the airflow path through the outlet; and a second fuel nozzle within the vane operable to directly inject fuel into the airflow path.

A further embodiment of any of the foregoing embodiments of the present disclosure includes a spraybar within the vane, the spraybar in communication with the first fuel nozzle and the second fuel nozzle.

A further embodiment of any of the foregoing embodiments of the present disclosure includes, wherein an interior of the vane receives the secondary airflow such that the interior is at a higher pressure than the primary combustion gas exhaust airflow of the airflow path.

A further embodiment of any of the foregoing embodiments of the present disclosure includes, wherein the airflow path is a core airflow path within the gas turbine engine.

A further embodiment of any of the foregoing embodiments of the present disclosure includes, wherein the airflow path is a primary combustion gas exhaust airflow.

A further embodiment of any of the foregoing embodiments of the present disclosure includes, wherein the airflow path is within a combustor section of the gas turbine engine.

A method of injecting fuel within a gas turbine engine according to another disclosed non-limiting embodiment of the present disclosure includes at least partially premixing and prevaporizing fuel with a secondary airflow from within a vane in an air channel within the vane, the vane within an airflow path of the gas turbine engine.

A further embodiment of any of the foregoing embodiments of the present disclosure includes directly injecting the fuel into the airflow path; and selectively activating the at least partial premixing and prevaporizing independent of the directly injecting.

A further embodiment of any of the foregoing embodiments of the present disclosure includes, wherein the selectively activating occurs during a high power operating condition.

A further embodiment of any of the foregoing embodiments of the present disclosure includes, wherein the vane is within an augmentor section.

A further embodiment of any of the foregoing embodiments of the present disclosure includes, wherein the vane is within a combustor section.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
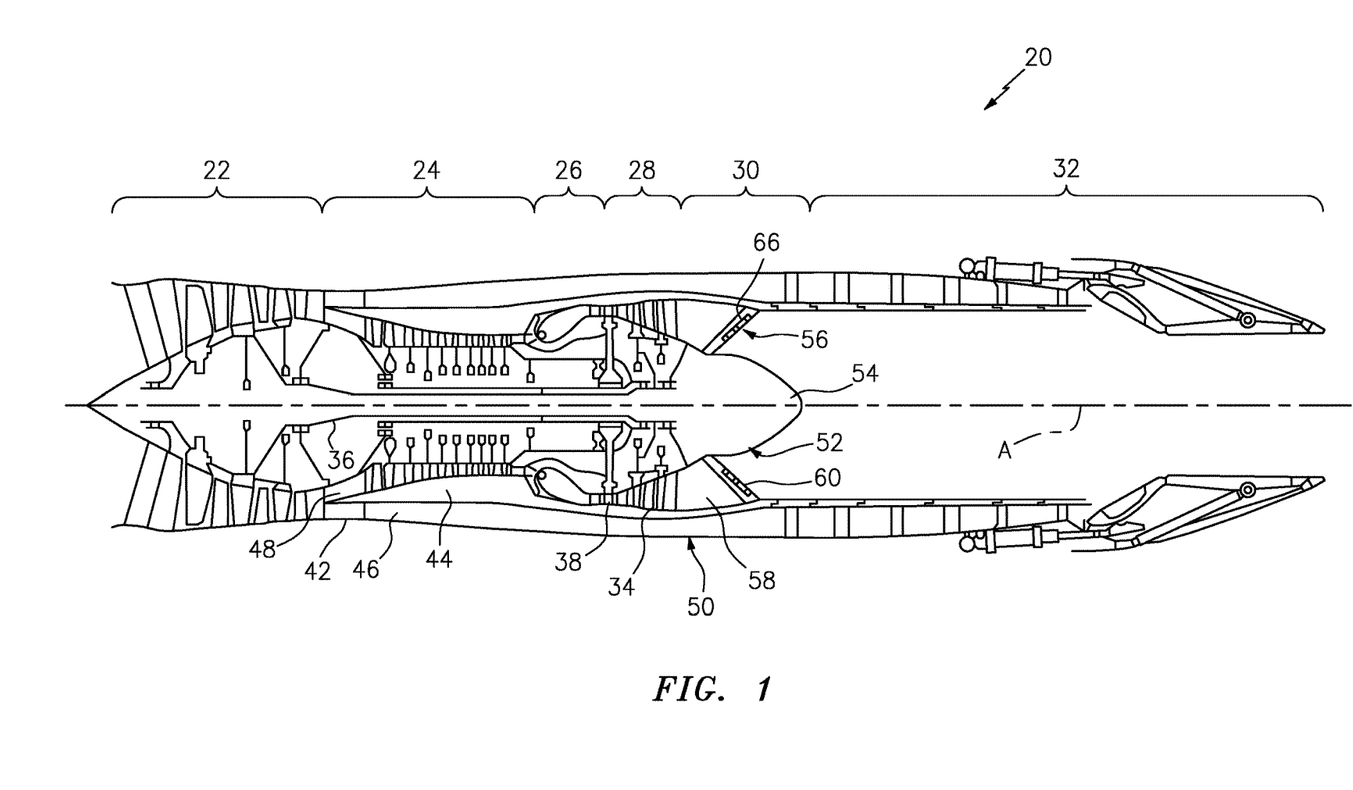
FIG. 1 is a general schematic view of an exemplary gas turbine engine embodiment for use with the present disclosure.

FIG. 1 schematically illustrates a gas turbine engine 20. The gas turbine engine 20 is disclosed herein as a two-spool turbofan that generally incorporates a fan section 22, a compressor section 24, a combustor section 26, a turbine section 28, an augmenter section 30 and a nozzle section 32. The sections are defined along a central longitudinal engine axis A. Although depicted as an augmented low bypass turbofan in the disclosed non-limiting embodiment, it should be understood that the concepts described herein are applicable to other gas turbine engine architectures to include non-augmented engines, geared architecture engines, direct drive turbofans, turbojet, turboshaft, multi-stream variable cycle adaptive engines and other engine architectures. Variable cycle gas turbine engines power aircraft over a range of operating conditions and essentially alter a bypass ratio during flight to achieve countervailing objectives such as high specific thrust for high-energy maneuvers yet optimize fuel efficiency for cruise and loiter operational modes.

The compressor section 24, the combustor section 26 and the turbine section 28 are generally referred to as the engine core. The fan section 22 and a low pressure turbine 34 of the turbine section 28 are coupled by a first shaft 36 to define a low spool. The compressor section 24 and a high pressure turbine 38 of the turbine section 28 are coupled by a second shaft to define a high spool.

An outer engine structure 42 and an inner engine structure 44 define a generally annular secondary airflow path 46 around a primary airflow path 48 of the engine core. It should be understood that various structure may define the outer engine structure 42 and the inner engine structure 44 to essentially define an exoskeleton.

Air that enters the fan section 22 is divided between a core flow through the primary airflow path 48 and a secondary airflow through the secondary airflow path 46. The core flow passes through the combustor section 26, the turbine section 28, then the augmentor section 30 where fuel may be selectively injected and burned to generate additional thrust through the nozzle section 32. The secondary airflow may be utilized for a multiple of purposes to include, for example, cooling and pressurization. The secondary airflow as defined herein is any flow different than the primary combustion gas exhaust airflow. The secondary airflow passes through an annulus defined by the outer engine case structure 42 and the inner engine structure 44 then may be at least partially injected into the primary airflow path 48 adjacent the augmentor section 30 and the nozzle section 32.

Figure 2:
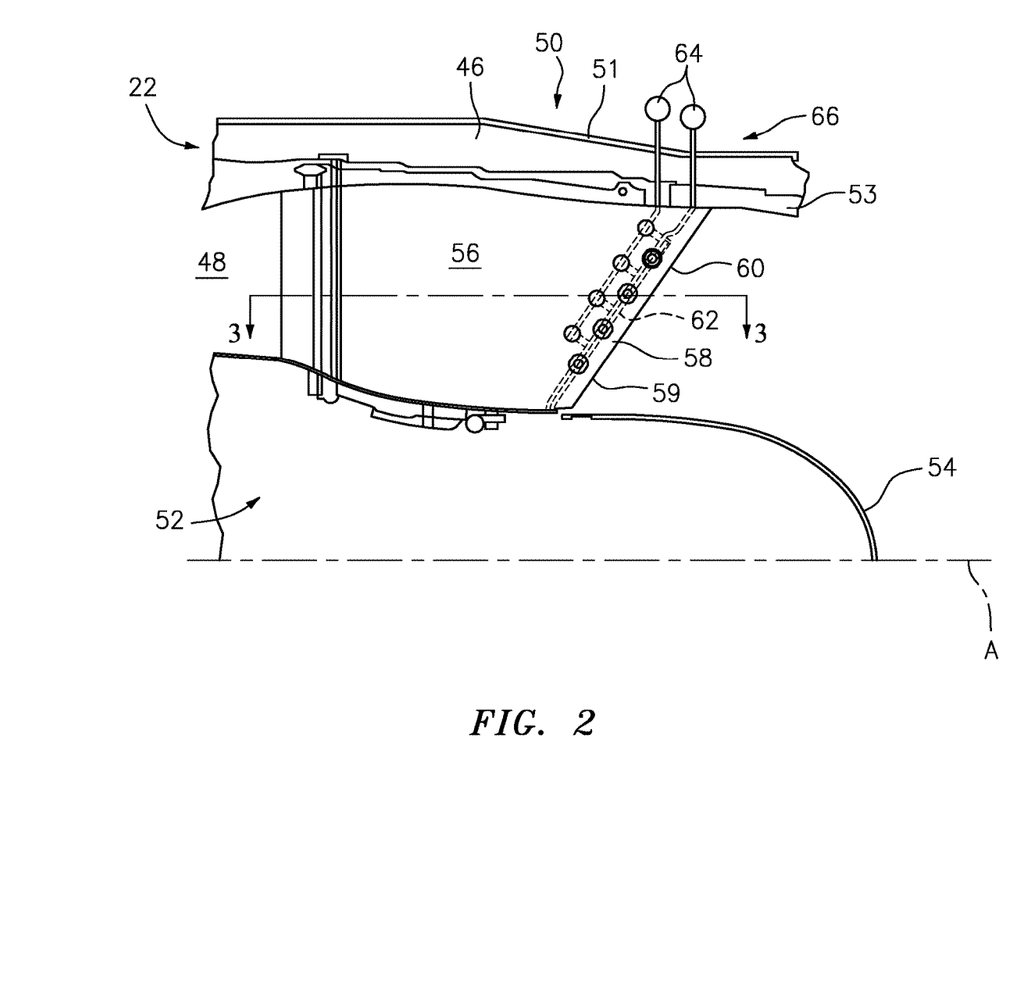
FIG. 2 is an expanded sectional view of a vane within an augmentor section of the gas turbine engine according to one disclosed non-limiting embodiment.

With reference to FIG. 2, the augmenter section 30 generally includes a turbine exhaust case (TEC) 50 and a center body 52 with a tail cone 54. The TEC 50 generally includes an outer case 51 of the outer engine structure 42 and a concentrically spaced inner liner 53 that operates as a heat shield to protect the outer case 51 from the core exhaust gas flow. Air discharged from, for example, the fan section 22 is communicated through the secondary airflow path 46 defined in part by the outer case 51 and the inner liner 53.

Circumferentially arrayed vanes 56 extend generally radially between the center body 52 and the TEC 50. Each of the vanes 56 have circumferentially opposite first and second walls 58, 60 through which secondary airflow passes to cool and pressurize the vanes 56. The multiple of vanes 56 operate, in one disclosed non-limiting embodiment, as bluff-body flameholders by providing a rear-facing flame holder surface 59 to hold the flame. Combustion instability is a phenomenon that can occur in high-output combustion systems and may limit operation, which, if allowed to occur for prolonged periods, may damage hardware as a result of cyclic stresses. Such high-frequency combustion instability in thrust augmenters is commonly referred to as "screech".

Each of the particular vanes 56 contain a spraybar 62 that extends from a fuel manifold 64 (illustrated schematically) of an augmentor fuel injection system 66. The fuel manifold 64 may be located radially outboard such that the spraybars 62 extend radially inward, as shown, or the fuel manifold may alternatively or additionally be located radially inboard such that the spraybars extend radially outward. The spraybars 62 spray fuel through the circumferentially opposite first and second walls 58, 60 of the vanes 56 at generally right angles directly into the core exhaust gas stream downstream of the turbine section 28. The rear-facing flame holder surface 59 provides a low velocity region in the core exhaust gas stream to facilitate flame stability in the augmentor section 30. An igniter or pilot system is operated to ignite and maintain ignition of the fuel sprayed into the augmentor section 30.

Figure 3:
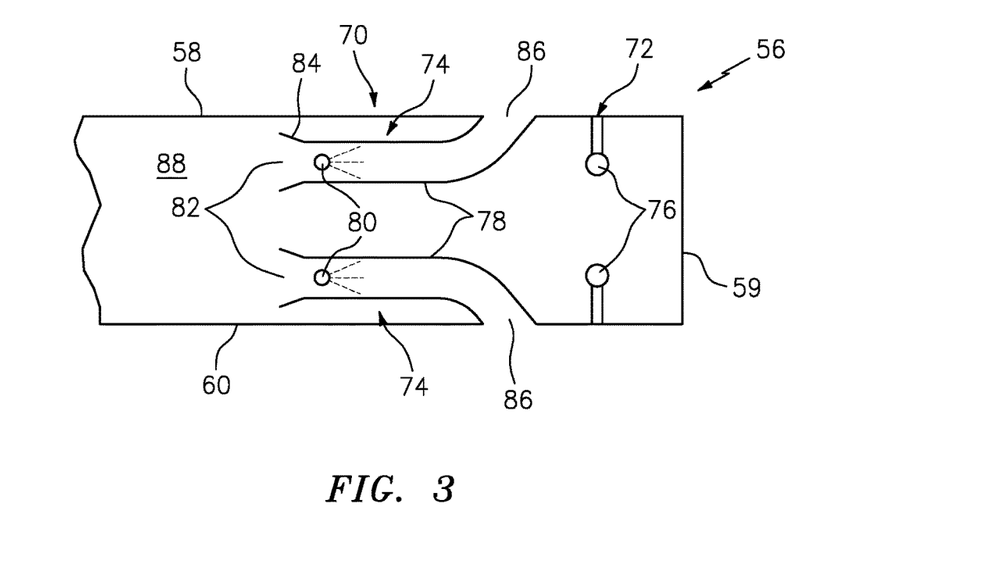
FIG. 3 is a sectional view of the secondary fuel injector.

With reference to FIG. 3, at least one of the multiple of vanes 56 includes a Carbureted Fuel Injection System (CFIS) 70 in addition to a Jet-in-Cross Flow (JCF) fuel injection system 72 that can be positioning upstream, downstream, or adjacent to the JCF injection system 72. In this disclosed non-limiting embodiment, the CFIS. 70 and the JCF fuel injection system 72 receive fuel from the spraybars 62 to spray fuel into the core exhaust gas stream downstream of the turbine section 24 to mix with oxygen and ignite to generate a second combustion and increased thrust. Although only a single CFIS fuel injector 74 and a single JCF fuel injector 76 are schematically illustrated in each of the respective first and second walls 58, 60, it should be appreciated that any number may be included in each vane 56. Although a single CFIS fuel injector 74 is shown upstream of a single JCF fuel injector 76 are schematically illustrated in each of the respective first and second walls 58, 60, it should be appreciated that several orientations of the injectors are possible in each vanes 56. In one disclosed non-limiting embodiment, a multiple of CFIS fuel injectors 74 are radially distributed along a span of the vane 56. Furthermore, it should be appreciated that all or only a subset of the vanes 56 may include the CFIS system 70 and the JCF fuel injection system 72.

Figure 4:
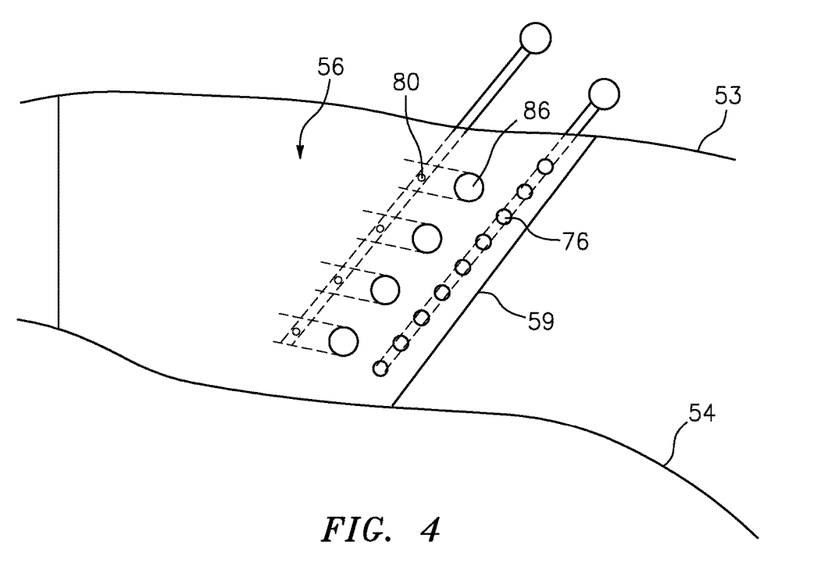
FIG. 4 is a side view of the vane illustrating a multiple of outlets from Carbureted Fuel Injection System (CFIS) and a Jet-in-Cross Flow (JCF) Fuel Injection System.

Each CFIS fuel injector 74 generally includes an air channel 78 and a fuel nozzle 80 within the air channel 78 to provide carbureted fuel injection. "Carbureted" as defined herein includes the at least partial premixing of fuel within the air channel 78. Each air channel 78 defines an inlet 82 which may include a bell-mouth 84 within the vane 56 and an outlet 86 through the respective first and second walls 58, 60 (FIG. 4) that may be circular or of other shapes such as a slot and oriented perpendicular to the first and second walls 58, 60 or at angles.

An interior 88 of the vane 56 receives secondary airflow from the secondary airflow path 46 such that the interior 88 is at a higher pressure than the primary combustion gas exhaust airflow. Secondary airflow is thereby communicated through the air channel 78 into the primary combustion gas exhaust airflow.

Figure 5:
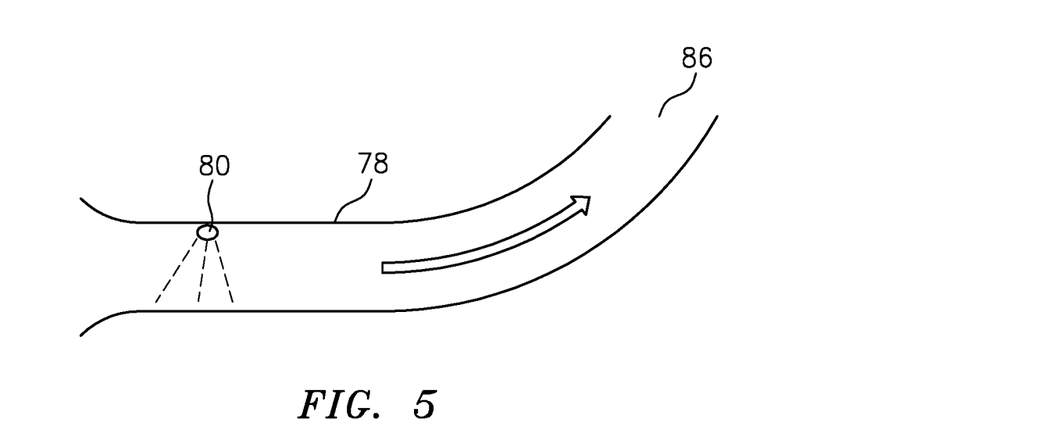
FIG. 5 is an expanded view of a CFIS fuel injector according to another disclosed non-limiting embedment.
Figure 6:
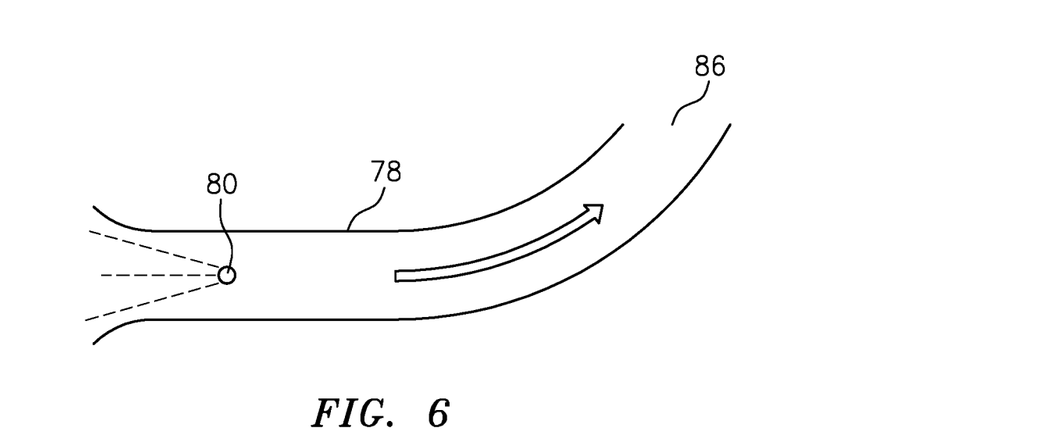
FIG. 6 is an expanded view of a CFIS fuel injector according to another disclosed non-limiting embedment.

The fuel nozzle 80 injects fuel into the air channel 78. In one disclosed non-limiting embodiment, the fuel nozzle 80 is directed downstream with the airflow through the air channel 78. In other disclosed non-limiting embodiments, the fuel nozzle 80 is directed transverse (FIG. 5) or upstream (FIG. 6) to the airflow within the air channel 78. It should be appreciated that various fuel injection geometries into the air channel 78 may be provided to premix and pre-vaporize fuel with air in the air channel 78 prior to ejection through the outlet 86.

In one disclosed non-limiting embodiment, the CFIS system 70 pre-vaporizes and premixes about 5-20% of the total fuel sprayed by the augmenter section 30. The CFIS system 70 thereby produces a well-prepared fuel-air mixture which then flows out and along the first and second walls 58, 60 of the vane 56 to feed the flow located in the wake of the rear-facing flame holder surface 59 behind the vane 56 which facilitates combustion stability. With this arrangement, the JCF fuel injection system 72 may still inject a portion (e.g. 80-95%) of the total fuel injected into the augmenter section 30 with high penetration to facilitate overall combustion efficiency. Through adjustment of the JCF/CFIS fuel split, optimal fueling of the wake can be realized over all engine and flight conditions which results in a robustly stabilized system that is insensitive to flight and operating conditions to provide stable, screech-free operation. Although the portion of fuel to the CFIS fuel injector 74 is discussed as 5-20%, it should be appreciated that any proportion of fueling between the CFIS and JCF injectors is applicable.

In one disclosed non-limiting embodiment, the CFIS system 70 and the JCF fuel injection system 72 may inject fuel in accords with a predetermined fuel split. That is, the CFIS system 70 may, for example only, inject about 5-20% of the total fuel sprayed into the augmenter section 30 and the JCF fuel injection system 72 injects the remainder. In another disclosed non-limiting embodiment, the CFIS system 70 is selectively activated at particular engine operational conditions such as at high power.

The CFIS. 70 allows the fuel distribution to be optimally tuned for different operational conditions. "Screech" generally occurs at high flight speeds where the pressure and combustion rate in the augmenter is greatest. Research has shown that combustion instability is linked to the static stability of a flameholder and fuel which is supplied into the flameholder wake as well as control of fuel to the augmenter section 30 alters the combustion process and may be used to avoid screech.

As the CFIS. 70 is located within the vanes 56, the CFIS. 70 has minimal—if any—influence on external geometry or cooling yet increases overall system capabilities and reduces life cycle costs. The vanes 56 may also be readily retrofit to the engine 20.

Figure 7:
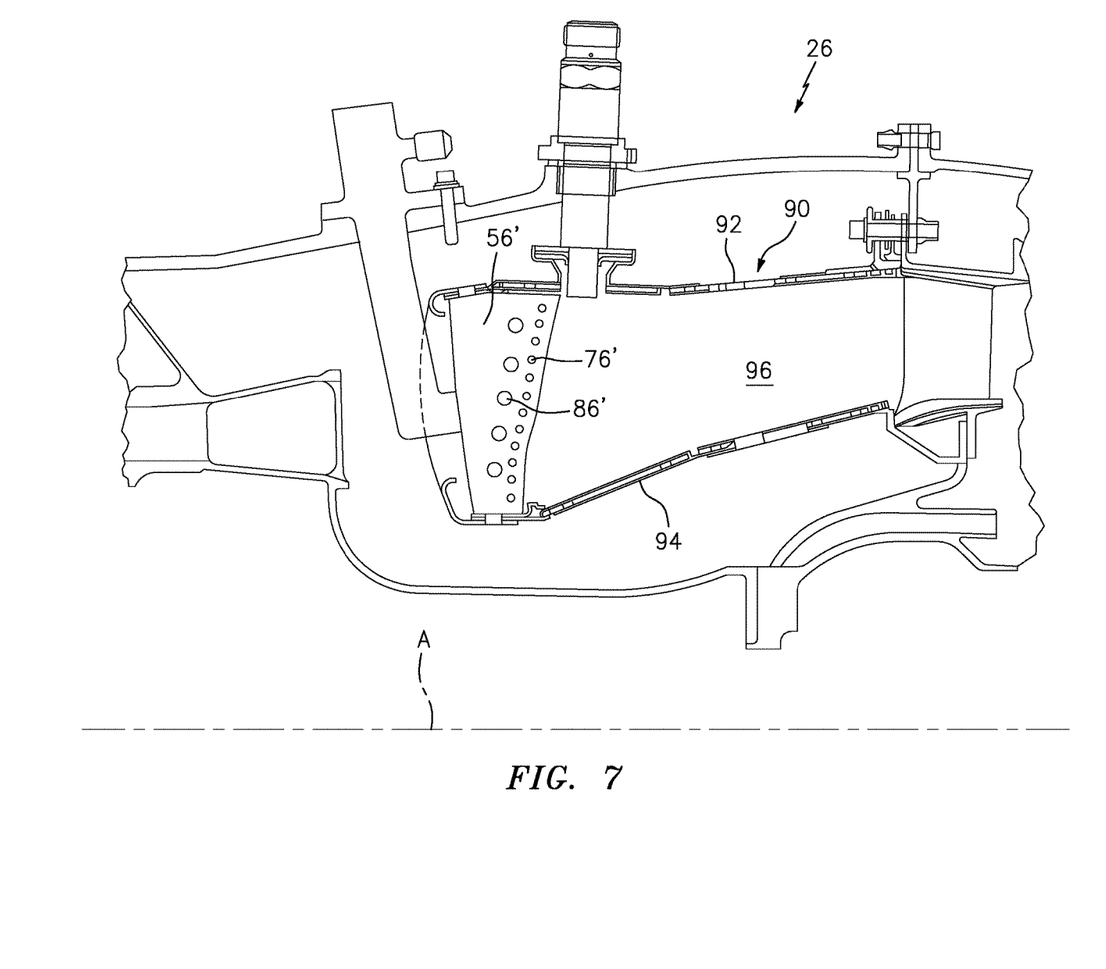
FIG. 7 is an expanded sectional view of a vane within a combustor section of the gas turbine engine according to another disclosed non-limiting embodiment.

With reference to FIG. 7, in another disclosed non-limiting embodiment, the vanes 56' may alternatively or additionally be located in other engine sections such as the combustor section 26. That is, the vanes 56' may be, for example, located within a combustor 90 generally between an outer combustor wall 92 and an inner combustor wall 94. The outer combustor wall assembly 92 and the inner combustor wall 94 are spaced apart such that a combustion chamber 96 is defined therebetween to receive carbureted fuel from the outlet 86' and direct fuel injection from the fuel injectors 76' of the vanes 56' as discussed above. It should be appreciated that various engine sections will alternatively or additionally benefit herefrom.

It should be understood that like reference numerals identify corresponding or similar elements throughout the several drawings. It should also be understood that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of injecting fuel within a gas turbine engine, comprising:

at least partially premixing and prevaporizing fuel from a fuel nozzle with a secondary airflow from within a vane in an air channel within the vane, the vane within an airflow path of the gas turbine engine, wherein said fuel nozzle is directed substantially transverse with respect to the secondary airflow through said air channel, wherein said vane is located within an augmentor section of the gas turbine engine that is downstream of a combustor section of the gas turbine engine, wherein said secondary airflow is received from a secondary airflow path, and wherein said secondary airflow path is defined by an outer engine structure and an inner engine structure of the gas turbine engine.

2. The method as recited in claim 1, further comprising: selectively activating the at least partial premixing and prevaporizing.

3. The method as recited in claim 2, wherein the selectively activating occurs during a high power operating condition.

4. A fuel injection system for a gas turbine engine comprising:
- a vane within an augmentor section of the gas turbine engine that is downstream of a combustor section of the gas turbine engine, the vane in an airflow path within the gas turbine engine, said vane includes an air channel with an outlet in communication with the airflow path; and
- a fuel nozzle within said vane operable to inject fuel into said air channel to at least partially premix and prevaporize the fuel with a secondary airflow from within said vane in said air channel prior to entry into the airflow path through the outlet,
- wherein said fuel nozzle is directed substantially transverse with respect to the secondary airflow through said air channel,
- wherein said secondary airflow is received from a secondary airflow path, and
- wherein said secondary airflow path is defined by an outer engine structure and an inner engine structure of the gas turbine engine.

5. The system as recited in claim 4, wherein the airflow path is a core airflow path within the gas turbine engine.

6. The system as recited in claim 4, wherein the airflow path is a primary combustion gas exhaust airflow path.

7. The system as recited in claim 4, further comprising a second fuel injector within said vane, said second fuel injector is positioned downstream with respect to said outlet from said air channel.

8. The system as recited in claim 7, wherein the airflow path is a primary combustion gas exhaust airflow path, and wherein said second fuel injector directly injects fuel into the primary combustion gas exhaust airflow path.

9. The system as recited in claim 4, wherein an interior of said vane receives said secondary airflow such that said interior is at a higher pressure than an airflow within the airflow path.

10. A gas turbine engine comprising:
- a vane within an augmentor section of the gas turbine engine that is downstream of a combustor section of the gas turbine engine, the vane in an airflow path within the gas turbine engine, said vane includes an air channel with an outlet in communication with the airflow path;
- an outer engine structure and an inner engine structure that define a secondary airflow path;
- a first fuel nozzle within said vane operable to inject fuel into said air channel to at least partially premix and prevaporize the fuel with a secondary airflow from within said vane in said air channel prior to entry into the airflow path through the outlet; and
- a second fuel nozzle within said vane operable to directly inject fuel into the airflow path,
- wherein said first fuel nozzle is directed substantially transverse with respect to the secondary airflow through said air channel, and
- wherein said secondary airflow is received from the secondary airflow path.

11. The gas turbine engine as recited in claim 10, further comprising a spraybar within said vane, said spraybar in communication with said first fuel nozzle and said second fuel nozzle.

12. The gas turbine engine as recited in claim 10, wherein an interior of said vane receives said secondary airflow such that said interior is at a higher pressure than a primary combustion gas exhaust airflow of the airflow path.

13. The gas turbine engine as recited in claim 10, wherein said airflow path is a core airflow path within the gas turbine engine.

14. The gas turbine engine as recited in claim 10, wherein the airflow path is a primary combustion gas exhaust airflow path.

* * * * *